United States Patent
Davis et al.

(10) Patent No.: US 9,894,026 B2
(45) Date of Patent: Feb. 13, 2018

(54) AUTOMATIC AND PREDICTIVE MANAGEMENT OF ELECTRONIC MESSAGES

(71) Applicant: International Business Machines Corporation, Armonk, NY (US)

(72) Inventors: Ryan A. Davis, Raleigh, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/701,813

(22) Filed: May 1, 2015

(65) Prior Publication Data
US 2016/0323223 A1    Nov. 3, 2016

(51) Int. Cl.
*G06F 15/16*    (2006.01)
*H04L 12/58*    (2006.01)

(52) U.S. Cl.
CPC ............. *H04L 51/22* (2013.01); *H04L 51/02* (2013.01)

(58) Field of Classification Search
CPC .................................. H04L 51/22; H04L 51/02
See application file for complete search history.

(56) References Cited

U.S. PATENT DOCUMENTS

| | | | |
|---|---|---|---|
| 7,137,070 B2 | 11/2006 | Brown et al. | |
| 7,209,951 B2 | 4/2007 | Goldberg | |
| 7,603,424 B2 * | 10/2009 | Adams | H04M 1/72552 709/206 |
| 8,161,122 B2 | 4/2012 | Sood et al. | |
| 9,171,290 B1 * | 10/2015 | Croke | G06Q 10/107 |
| 2003/0233419 A1 * | 12/2003 | Beringer | G06Q 10/107 709/206 |
| 2006/0168046 A1 * | 7/2006 | Qureshi | G06Q 10/107 709/206 |
| 2006/0277210 A1 * | 12/2006 | Starbuck | G06Q 10/107 |
| 2007/0100948 A1 * | 5/2007 | Adams | H04M 1/72552 709/206 |
| 2008/0109448 A1 * | 5/2008 | Aboel-Nil | G06Q 10/107 |
| 2009/0157827 A1 | 6/2009 | Bangalore | |
| 2009/0319506 A1 * | 12/2009 | Ngan | G06Q 10/107 |
| 2012/0191546 A1 | 7/2012 | Phelan et al. | |
| 2012/0290662 A1 | 11/2012 | Weber et al. | |
| 2013/0166657 A1 | 6/2013 | Tadayon | |
| 2013/0204946 A1 * | 8/2013 | Forstall | G06Q 10/107 709/206 |
| 2014/0280616 A1 | 9/2014 | Ramanathan et al. | |

FOREIGN PATENT DOCUMENTS

WO    03058519 A2    7/2003

OTHER PUBLICATIONS

Disclosed Anonymously; "Recipient selected email subject and body template"; IP.com Prior Art Database Technical Disclosure; IP.com No. 000236026; pp. 1-3; Electronic Publication Apr. 2, 2014.
"Sanebox"; Sanebox TechCrunch; Printed Feb. 17, 2015; pp. 1-3; Copyright 2013-2015 AOL Inc; <techcrunch.com/tag/sanebox>.

* cited by examiner

*Primary Examiner* — John B Walsh
(74) *Attorney, Agent, or Firm* — David S. Richart (57) ABSTRACT

A first email is received. If the first email is similar to at least one received email is determined. Responsive to the determination, an action for the first email is provided. The action is the same as an action taken for the similar at least one received.

12 Claims, 4 Drawing Sheets

AUTOMATIC AND PREDICTIVE MANAGEMENT OF ELECTRONIC MESSAGES

BACKGROUND

The present invention relates generally to the field of electronic mail, and more particularly to analysis, organization, and template creation of electronic mail messages.

Electronic mail, or emails, are digital messages that are exchanged between a sender and one or more recipients. The emails are transferred between devices connected over a network, such as the Internet. Email applications that allow a user to access and manage the user's emails operate on a client-server model whereby messages are sent to and stored in a networked server for the recipient, thereby allowing for non-real time correspondence between the sender and the recipient. Email applications, which may be web-based or personal computer-based, typically provide a variety of options for managing emails, such as the ability to delete a message, send a message in response back to the sender, and move an email for storage in a particular folder.

SUMMARY

Embodiments of the present invention include a method, computer program product, and system for managing emails. In one embodiment, a first email is received. If the first email is similar to at least one received email is determined. Responsive to the determination, an action for the first email is provided. The action is the same as an action taken for the similar at least one received email.

DETAILED DESCRIPTION

Embodiments of the present invention provide for efficiently organizing emails. Embodiments of the present invention provide for predicting and conveniently providing an executable user action for emails. Embodiments of the present invention provide for creating a template email. The program monitors a user's actions taken for emails and automatically provides an efficient option to take the same user action when similar emails are received in the future. The program monitors a user's composed emails and creates a template email structure and content that is provided for similar emails composed in the future.

Embodiments of the present invention recognize that society relies heavily on email communication. Embodiments of the present invention recognize that some incoming emails require attention more urgently than other incoming emails. Embodiments of the present invention additionally recognize that manually attending to individual emails is a laborious and time consuming process.

Emails are digital messages that are exchanged from a sender to one or more recipients across a network. An individual email may include body text content and subject line text content as well as descriptive information such as the sender's email address, recipient's address, and date and time sent. A user's inbox generally refers to the storage location for a user's incoming emails and may more specifically refer to the graphical interface through which an email application displays a user's emails. In an embodiment, an individual email in a user's inbox may be displayed to a user through a visual representation of the email such as a graphical icon that summarizes various data parameters of the email.

Figure 1:
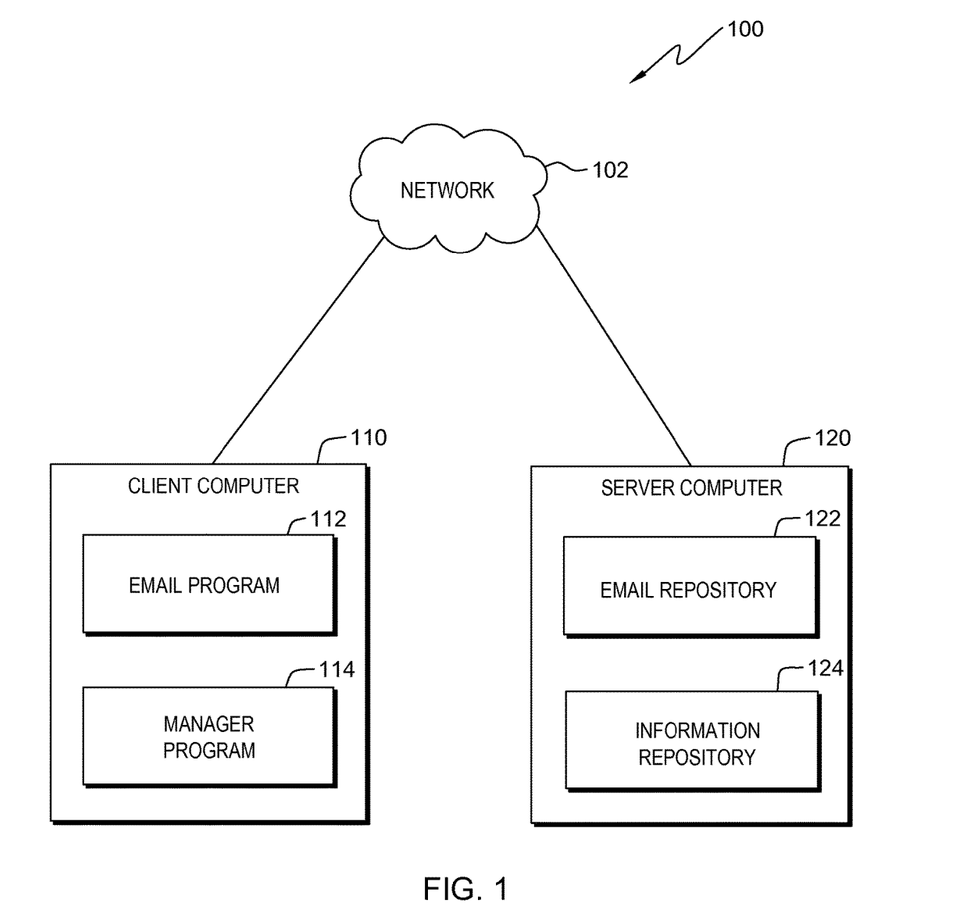
FIG. 1 is functional block diagram of a distributed data processing environment, in accordance with an embodiment of the present invention.

The present invention will now be described in detail with reference to the Figures. FIG. 1 is a functional block diagram illustrating distributed data processing environment 100 in accordance with one embodiment of the present invention. FIG. 1 is for illustrative purposes and does not imply any limitations with regard to the environments in which embodiments of the present invention may be implemented.

In the illustrated embodiment, distributed data processing environment 100 includes client computer 110 and server computer 120. Client computer 110 and server computer 120 are interconnected through network 102. In various embodiments, network 102 can be a local area network (LAN), a telecommunications network, a wide area network (WAN) such as the Internet, or any combination of the three, and can include wired, wireless, or fiber optic connections. In general, network 102 can be any combination of connections and protocols supports communications between client computer 110, server computer 120, and any other computer connected to network 102, in accordance with embodiments of the present invention.

In general, client computer 110 is any electronic device or combination of electronic devices capable of executing computer readable program instructions. In example embodiments, client computer 110 may be a workstation, personal computer, personal digital assistant, mobile phone, etc. In certain embodiments, client computer 110 may be a computer system utilizing clustered computers and components (e.g., database server computers, application server computers, etc.) that act as a single pool of seamless resources when accessed by elements of data processing environment 100, such as in a cloud computing environment. In the illustrated embodiment, client computer 110 includes email program 112 and manager program 114.

Email program 112 is a computer program, application, or subprogram of a larger program that provides access to and communicates with email repository 122 for handling emails stored in email repository 122. In an embodiment, email program 112 may provide functions for handling emails such as receiving, retrieving, viewing, responding (e.g., replying, replying all, forwarding), moving to a location (e.g., moving an email to a particular folder), deleting, and composing. In an embodiment, email program 112 may provide organizational features such as an inbox for incoming emails as well as various folders for sent emails, drafted emails, deleted emails, and any other categories of emails. In an embodiment, email program 112 may additionally provide functions for organizing a user's schedule such as a calendar and reminder notifications. In an embodiment, emails may be delivered to a computer and stored for the recipient (i.e., an email's sender and recipient may or may not be connected to the network concurrently for the email to be exchanged from sender to recipient). In the illustrated embodiment, a user of client computer 110 may utilize email program 112 to access email repository 122, located on server computer 120, through network 102. For example, in a web application, a user of a personal computer may utilize a web browser (email program 112) to access, through network 102, the user's emails stored on a remote web server. In an alternative embodiment, email program 112 may be located on another networked computer (not shown), and a user of client computer 110 may access and utilize email program 112 through network 102. Email program 112 is capable of communicating with manager program 114. Email program 112 may be connected to one or more user interface devices to allow a user to manipulate emails and otherwise utilize email program 112.

Manager program 114 is a computer program, application, or subprogram of a larger program that provides access to and communicates with information repository 124 for automatically managing emails, in accordance with embodiments of the present invention. In an embodiment, manager program 114 may provide functions for managing emails such as visually grouping similar emails in a user's inbox or other organizational folders, creating a template email format and content, automatically prioritizing emails, and providing a single easily accessible user action for an individual email or group of similar emails based on previous user actions taken for similar emails. In the illustrated embodiment, a user of client computer 110 may utilize manager program 114 to access information repository 124, located on server computer 120, through network 102. In an alternative embodiment, manager program 114 may be located on another networked computer (not shown), and a user of client computer 110 may access and utilize manager program 114 through network 102. In various embodiments, manager program 114 may be integrated with email program 112. Manager program 114 may be connected to one or more user interface devices to allow a user to manipulate emails and otherwise utilize manager program 114.

A user interface (not shown) is a computer program that provides an interface between a user and email program 112 and between a user and manager program 114. A user interface refers to the information, such as graphic, text, and sound, a program presents to a user and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In general, server computer 120 is any electronic device or combination of electronic devices capable of executing computer readable program instructions. In example embodiments, server computer 120 may be a workstation, personal computer, personal digital assistant, mobile phone, etc. In certain embodiments, server computer 120 may be a computer system utilizing clustered computers and components (e.g., database server computers, application server computers, etc.) that act as a single pool of seamless resources when accessed by elements of distributed data processing environment 100, such as in a cloud computing environment. In the illustrated embodiment, server computer 120 includes email repository 122 and information repository 124.

Email repository 122 contains emails received by, composed by, and sent from a user or users of email program 112. Email program 112 may access, retrieve, view, respond to, forward, delete, and otherwise utilize emails that are associated with a user and stored in email repository 122. In the illustrated embodiment, email repository 122 may be accessed by, and communicate with, email program 112 through network 102. In an alternative embodiment, email repository 122 may be located on client computer 110, and email program 112 may directly access and communicate with email repository 122. In yet another embodiment, email repository 122 may be located on another networked computer (not shown), and client computer 110 may access and communicate with email repository 122 through network 102.

Information repository 124 contains current and historical usage information associated with a user or users of manager program 114. In an embodiment, usage information stored in information repository 124 may include various data parameters of received and sent emails, user actions taken with emails, and statistical information such as the frequency at which any of the foregoing information occurs. In an embodiment, the data parameters of emails may include the address(es) of the sender(s), address(es) of the recipient(s), subject line text content, body text content, date and time sent, and the existence of, and names of, attached files. In an embodiment, user actions stored in information repository 124 may include accessing, viewing, responding to, forwarding, composing, or otherwise manipulating emails. In the illustrated embodiment, information repository 124 may be accessed by, and communicate with, manager program 114 through network 102. In an alternative embodiment, information repository 124 may be located on client computer 110, and manager program 114 may directly access and communicate with information repository 124. In yet another embodiment, information repository 124 may be located on another networked computer (not shown), and client computer 110 may access and communicate with information repository 124 through network 102.

Email repository 122 and information repository 124 may be implemented using any non-volatile storage media known in the art. For example, email repository 122 and information repository 124 may be implemented with a tape library, optical library, one or more independent hard disk drives, or multiple hard disk drives in a redundant array of independent disks (RAID). Similarly, email repository 122 and information repository 124 may be implemented with any suitable storage architecture known in the art, such as a relational database, an object-oriented database, or one or more tables.

Figure 2A:
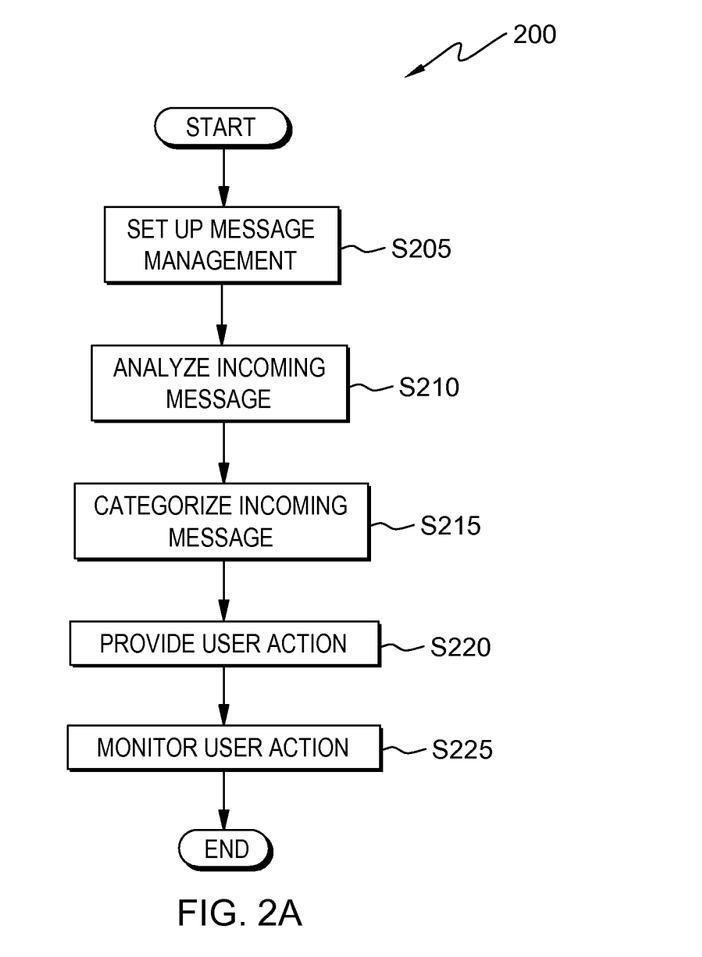
FIGS. 2A and 2B are flowcharts of operational steps for managing emails, providing a predicted user action, and creating a template email, in accordance with an embodiment of the present invention.

FIG. 2A is a flowchart of workflow 200 depicting operational steps for managing a user's incoming and outgoing emails based on current and historical usage information associated with the user, in accordance with an embodiment of the present invention. In the illustrated embodiment, steps of the workflow are performed by manager program 114. In an alternative embodiment, steps of the workflow can be performed by any other computer program while working with manager program 114.

Manager program 114 sets up email management (step S205). In other words, manager program 114 receives an indication to manage a user's emails. In an embodiment, a user, through the user interface of email program 112, may indicate to manager program 114 to manage the user's emails. In an alternative embodiment, a user, through the user interface of manager program 114, may indicate to manager program 114 to manage the user's emails. In yet another alternative embodiment, a user, through another computer program (not shown), may indicate to manager program 114 to manage the user's emails.

Manager program 114 analyzes an incoming message (step S210). In other words, manager program 114 analyzes various data parameters of an incoming email. In an embodiment, the data parameters of an incoming email may include the address(es) of the sender(s), address(es) of the recipient(s), subject line text content, body text content, date and time sent, and the existence of, and names of, attached files. In an embodiment, manager program 114 analyzes the text content fields of an incoming email, for example the body text content, according to data parameters that include individual characters (e.g., letters, numbers), special keystrokes (e.g., "#", "@", "*", "!"), sequences of characters (e.g., words), sequences of words (e.g., phrases, sentences), and formatting (e.g., bullet points, indentations, uppercase letters, red numbers, bold words). The data parameters of analyzed emails are stored in information repository 124. The data parameters of an analyzed email may remain stored in information repository 124 irrespective of whether the corresponding email itself is concurrently stored in email repository 122.

Manager program 114 categorizes the incoming message (step S215). In other words, manager program 114 categorizes the incoming email based on the email's data parameters (step S215). More specifically, manager program 114 compares the data parameters of the incoming email with the data parameters of emails in the user's inbox that have already been analyzed. If the data parameters of the incoming email are similar to the data parameters of at least one other email in the user's inbox, then manager program 114 groups and condenses those similar emails into a single visual representation in the user's inbox. Alternatively, if the data parameters of the incoming email are similar to those of emails that are already grouped and condensed in the user's inbox, then manager program 114 adds the incoming email to the condensed group. For example, IT User is a member of the software upgrade team and receives several emails every week from IT User's boss regarding the software upgrade project. Upon receiving and analyzing one of the emails, IT User's manager program 114 recognizes that the incoming email has the same sender ("boss@co.com"), subject line text content ("software upgrade project"), and words in the body text content ("compiler," "operating system," "debugging the jump problem") as another email in IT User's inbox that the program had previously analyzed. The program condenses those similar messages from IT User's boss such that a single visual representation in IT User's inbox represents both messages. In an embodiment, the single visual representation may be an image depicting a preview of the most recently received email of the condensed group. In an embodiment, hovering over the image may cause the preview to expand and display previews for all of the emails in the condensed group.

In an embodiment, manager program 114 prioritizes the incoming message if the user's action is needed. More specifically, manager program 114 analyzes the text content fields of the incoming email for indicators of urgency. For example, manager program 114 may analyze the incoming email for text content (e.g., words, phrases) that is commonly used to request immediate attention such as "immediate," "tomorrow," and "urgent." As another example, manager program 114 may analyze the email incoming email for formatting aspects that are commonly used to indicate urgency including font aspects (e.g., words with all letters capitalized, bold text, red color text) and punctuation (e.g., "!"). In an embodiment, manager program 114 prioritizes an email by moving the email to a separate location in the user's inbox or to separate folder. In an embodiment, the separate inbox location or separate folder may be visually distinct from rest of the user's inbox and folders through formatting aspects such as font aspects (e.g., red folder color, green text color, increased text size, bold text, highlighted text, italicized text) and through locational aspects such as being at the top of the inbox or being above other folders. For example, IT User's boss encounters a significant problem with the software upgrade project and sends an email to IT User requesting help. IT User's manager program 114 recognizes indicators of urgency in the incoming email's text content fields such as "Respond immediately!" and "fix this NOW", and the program prioritizes the email by moving it from the inbox to a separate red-colored folder named "Important," which appears in bold font. In an embodiment, manager program 114 additionally may be manually provided, by a user, with specific indicators to be recognized as indicators of urgency.

Manager program 114 provides a user action for the incoming message (step S220). More specifically, manager program 114 compares the data parameters of the incoming email with the data parameters stored in information repository 124, which correspond to emails that have been previously analyzed by manager program 114. If the data parameters of the incoming email are similar to one or more data parameters stored in information repository 124, manager program 114 provides the particular user action that is associated with the emails corresponding to those similar data parameters. If the incoming email has been condensed in the user's inbox with other emails of the group, manager program 114 the user action for the entire condensed group. In an embodiment, the associated user action may be an option to respond (i.e., reply, reply all, forward), delete, or move the email to a particular folder in the user's inbox. In an embodiment, manager program 114 may provide the associated user action by displaying a graphical icon near the email's visual representation in the user's inbox, or the condensed group's icon, in the user's inbox. If manager program 114 does not associate a user action with the email, for example when the email's data parameters are not similar to those store in information repository 124, then manager program 114 does not provide a user action for the email and the email is monitored according to step S225.

In an embodiment, the user action provided by manager program 114 may be a template email for responding to an incoming email. More specifically, when manager program 114 provides a user action that involves text content, for example a reply email, manager program 114 additionally provides a template email for the response. In an embodiment, the template may include an email body that is prepopulated with formatting (e.g., bullet points, indentations) and text content (e.g., "Dear Boss"). Manager program 114 creates a template based on the formatting aspects and text content of the user's previous outgoing emails that were sent in response to emails with data parameters similar to those of the incoming email.

Manager program 114 monitors the user action (step S225). In other words, manager program 114 monitors the user action actually taken for the email. In an embodiment, manager program 114 determines whether the user action taken for an incoming email is the same user action the user took previously for similar emails. If the user action taken for the email is the same, manager program 114 statistically reinforces the associated user action. If the user action taken is different, manager program 114 statistically updates the associated user action accordingly. In an embodiment, the associated user action is updated such that a statistical threshold is met and manager program 114 associates a new user action as the standard user action for the incoming email and similar emails (i.e., manager program 114 is dynamic and learns with ongoing usage). For example, IT User recently left the software upgrade project team. However, IT User continues to receive emails regarding the project. After monitoring that IT User repeatedly deletes these emails instead of moving them into folder "Project," IT User's manager program 114 updates the user action associated with the software upgrade project emails and now provides IT User the option to delete incoming software upgrade project emails. If the incoming email is not similar to any previously analyzed emails, and manager program 114 therefore does not yet associate a user action with the incoming email, then manager program 114 associates the user action actually taken with the incoming email. User actions and related statistical information are stored in information repository 124.

In an alternative embodiment, manager program 114 monitors the text content and formatting aspects used for a response email. Manager program 114 determines whether text content and formatting aspects used for a response email are the same as those provided in a template for the email. If any text and formatting used for the email is the same as the template associated with the email, manager program 114 statistically reinforces those aspects of the template. If any text and formatting is different, manager program 114 statistically updates the template aspects accordingly. In an embodiment, the template associated with the email is updated such that a statistical threshold is met and manager program 114 changes the one or more text content or formatting aspects in the associated template. Template information (i.e., text content and formatting aspects of monitored emails) and related statistical information is stored in information repository 124.

Figure 2B:
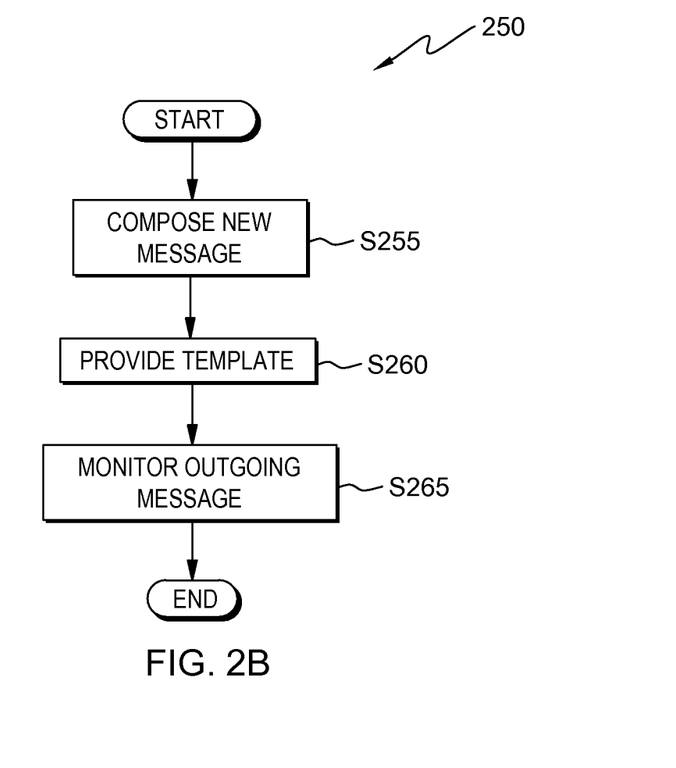

FIG. 2B is a flowchart of workflow 250 depicting operational steps for providing a template outgoing email based on current and historical usage information associated with a user, in accordance with an embodiment of the present invention. In the illustrated embodiment, steps of the workflow are performed by manager program 114. In an alternative embodiment, steps of the workflow can be performed by any other computer program while working with manager program 114.

Manager program 114 composes a new message (step S255). In other words, manager program 114 receives an indication from a user to compose a new outgoing email. In an embodiment, a user, through the user interface of email program 112, may indicate to manager program 114 to compose a new email. In an alternative embodiment, a user, through the user interface of manager program 114, may indicate to manager program 114 to compose a new email. In yet another alternative embodiment, a user, through another computer program (not shown), may indicate to manager program 114 to compose a new email.

Manager program 114 provides a template (step S260). In other words, manager program 114 provides a template email for the new outgoing email. Manager program 114 creates the template based on the formatting aspects and text content of the user's previous composed emails with data parameters similar to those of the new composed email. For example, every Friday IT User sends an email to IT User's boss regarding the status of servers A, B, and C. IT User repeatedly formats these messages with three bullet points and describes the status of a server after each bullet point. IT User's manager program 114 creates a template message associated with emails having data parameters that include a recipient as "boss@.co.com" and a subject line as "server status". As IT User begins composing an email to "boss@.co.com" and types the subject line "server status", IT User's manager program 114 provides the template email by prepopulating the email body with three bullet points.

Manager program 114 monitors the outgoing message (step S265). In other words, manager program 114 monitors the text content and formatting aspects of the outgoing email. In an embodiment, manager program 114 determines whether text content and formatting aspects used for the outgoing email are the same as those provided in the template for the email. If any text and formatting used for the email is the same as the template associated with the email, manager program 114 statistically reinforces those aspects of the template. If any text and formatting is different, manager program 114 statistically updates the template aspects accordingly. In an embodiment, the template associated with the email is updated such that a statistical threshold is met and manager program 114 changes the one or more text content or formatting aspects of the associated template. Template information (i.e., text content and formatting aspects of monitored emails) and related statistical information is stored in information repository 124.

Figure 3:
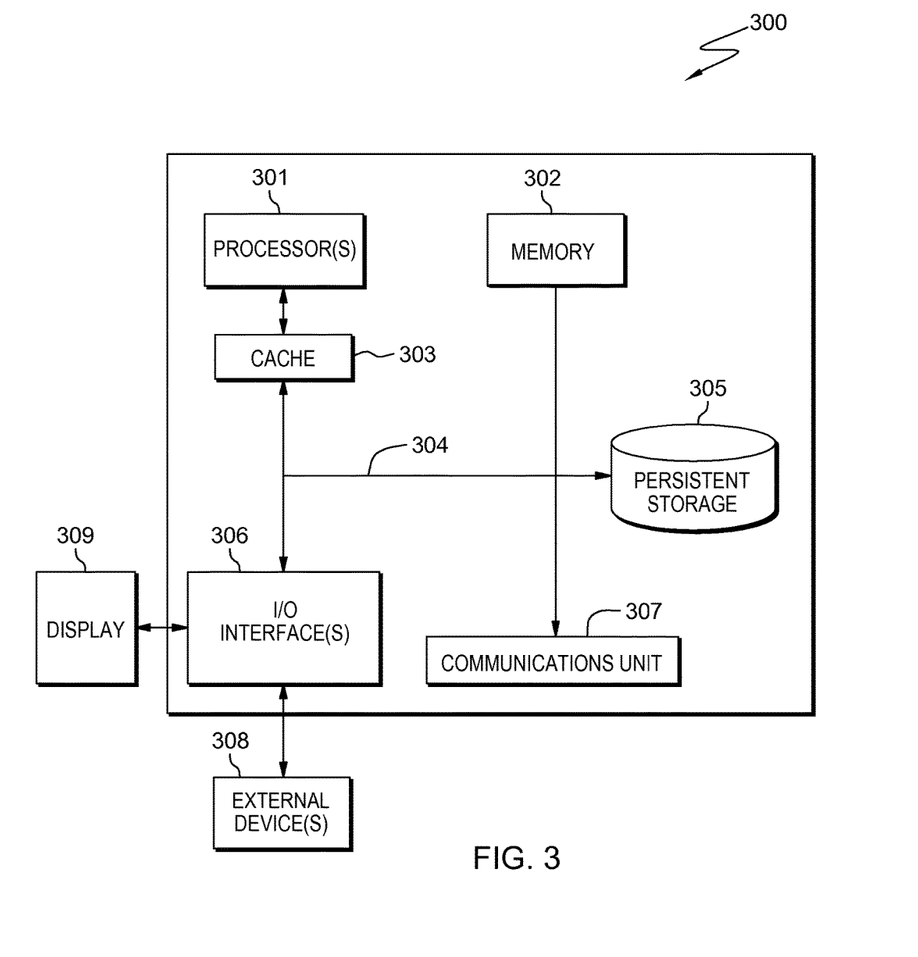
FIG. 3 is a block diagram of components of the client computer and server computer of FIG. 1, in accordance with an embodiment of the present invention.

FIG. 3 depicts computer 300, which illustrates an example of the components of client computer 110 and server computer 120 of FIG. 1. Computer 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing emails, the method comprising the steps of:
   determining, by one or more computer processors, a formatting and a text content of a response email, wherein the response email responds to at least one received email;
   generating, by one or more computer processors, a template response, wherein the template response comprises the formatting and the text content of the response email;
   associating, by one or more computer processors, the template response with the at least one received email;
   receiving, by one or more computer processors, a first email;
   determining, by one or more computer processors, if the first email is similar to the at least one received email;
   responsive to determining the first email is similar to the at least one received email, providing, by one or more computer processors, the template response for the first email;
   determining, by one or more computer processors, a formatting and a text content of at least one composed email;
   generating, by one or more computer processors, a template new email, wherein the template new email comprises the formatting and the text content of the at least one composed email;
   associating, by one or more computer processors, the template new email with the at least one composed email;
   receiving, by one or more computer processors, an indication to compose a new email; and
   responsive to determining the new email is similar to the at least one composed email, providing, by one or more computer processors, the template new email for the new email.

2. The method of claim 1, wherein determining if the first email is similar to the at least one received email comprises:
   identifying, by one or more computer processors, at least one data parameter of the first email, wherein the at least one data parameter comprises one or more of the following: a sender address, a recipient address, a subject line text content, a body text content, a date sent, a time sent, an existence of an attached file, and a name of an attached file name; and
   determining, by one or more computer processors, if the at least one data parameter of the first email is similar to at least one data parameter of each of the at least one received emails.

3. The method of claim 1, further comprising:
   receiving, by one or more computer processors, a second email; and
   determining, by one or more computer processors, if the second email is similar to the at least one received email.

4. The method of claim 3, wherein responsive to determining the first email is similar to at least one received email, providing, by one or more computer processors, the template response comprises:
   responsive to determining the first email is similar to the at least one received email and the second email is similar to the at least one received email, providing, by one or more computer processors, the template response for the first email and the second email.

5. A computer program product for managing emails, the computer program product comprising:
   one or more computer readable storage media; and
   program instructions stored on the one or more computer readable storage media, the program instructions comprising:
      program instructions to determine a formatting and a text content of a response email, wherein the response email responds to at least one received email;
      program instructions to generate a template response, wherein the template response comprises the formatting and the text content of the response email;
      program instructions to associate the template response with the at least one received email;
      program instructions to receive a first email;
      program instructions to determine if the first email is similar to the at least one received email;
      program instructions, responsive to determining the first email is similar to the at least one received email, to provide the template response for the first email;
      program instructions to determine a formatting and a text content of at least one composed email;
      program instructions to generate a template new email, wherein the template new email comprises the formatting and the text content of the at least one composed email;
      program instructions to associate the template new email with the at least one composed email;
      program instructions to receive an indication to compose a new email; and program instructions, responsive to determining the new email is similar to the at least one composed email, to provide the template new email for the new email.

6. The computer program product of claim 5, wherein the program instructions to determine if the first email is similar to the at least one received email comprise:

program instructions to identify at least one data parameter of the first email, wherein the at least one data parameter comprises one or more of the following: a sender address, a recipient address, a subject line text content, a body text content, a date sent, a time sent, an existence of an attached file, and a name of an attached file name; and program instructions to determine if the at least one data parameter of the first email is similar to at least one data parameter of each of the at least one received emails.

7. The computer program product of claim 5, further comprising program instructions, stored on the one or more computer readable storage media, to:

receive a second email; and determine if the second email is similar to the at least one received email.

8. The computer program product of claim 7, wherein the program instructions, responsive to determining the first email is similar to at least one received email, to provide the template response comprise:

program instructions, responsive to determining the first email is similar to the at least one received email and the second email is similar to the at least one received email, to provide the template response for the first email and the second email.

9. A computer system for managing emails, the computer system comprising:

one or more computer processors;

one or more computer readable store media; and program instructions, stored on the one or more computer readable storage media for execution by at least one of the one or more computer processors, the program instructions comprising:

program instructions to determine a formatting and a text content of a response email, wherein the response email responds to at least one received email;

program instructions to generate a template response, wherein the template response comprises the formatting and the text content of the response email;

program instructions to associate the template response with the at least one received email;

program instructions to receive a first email;

program instructions to determine if the first email is similar to the at least one received email;

program instructions, responsive to determining the first email is similar to the at least one received email, to provide the template response for the first email;

program instructions to determine a formatting and a text content of at least one composed email;

program instructions to generate a template new email, wherein the template new email comprises the formatting and the text content of the at least one composed email;

program instructions to associate the template new email with the at least one composed email;

program instructions to receive an indication to compose a new email; and program instructions, responsive to determining the new email is similar to the at least one composed email, to provide the template new email for the new email.

10. The computer system of claim 9, wherein the program instructions to determine if the first email is similar to the at least one received email comprise:

program instructions to identify at least one data parameter of the first email, wherein the at least one data parameter comprises one or more of the following: a sender address, a recipient address, a subject line text content, a body text content, a date sent, a time sent, an existence of an attached file, and a name of an attached file name; and program instructions to determine if the at least one data parameter of the first email is similar to at least one data parameter of each of the at least one received emails.

11. The computer system of claim 9, further comprising program instructions, stored on the one or more computer readable storage media for execution by the at least one of the one or more computer processors, to:

receive a second email; and determine if the second email is similar to the at least one received email.

12. The computer system of claim 11, wherein the program instructions, responsive to determining the first email is similar to at least one received email, to provide the template response comprise:

program instructions, responsive to determining the first email is similar to the at least one received email and the second email is similar to the at least one received email, to provide the template response for the first email and the second email.

\* \* \* \* \*